(No Model.)

E. J. B. WHITAKER.
CLOTHES SPRINKLER.

No. 255,368.        Patented Mar. 21, 1882.

Witnesses:
W. L. Langley.
A. E. Eader.

Inventor:
E. J. B. Whitaker
By his Atty
Chas B. Mann

N. PETERS. Photo-Lithographer, Washington, D. C.

United States Patent Office.

ELIJAH J. B. WHITAKER, OF BELAIR, MARYLAND.

CLOTHES-SPRINKLER.

SPECIFICATION forming part of Letters Patent No. 255,368, dated March 21, 1882.

Application filed September 13, 1881. (No model.)

*To all whom it may concern:*

Be it known that I, ELIJAH J. B. WHITAKER, a citizen of the United States of America, residing at Belair, in the county of Harford and State of Maryland, have invented certain new and useful Improvements in Clothes-Sprinklers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an improved device for dampening or sprinkling clothes preparatory to their being ironed. The construction of the device and its mode of operation will first be described, and the invention will then be designated in the claims.

Figure 1:
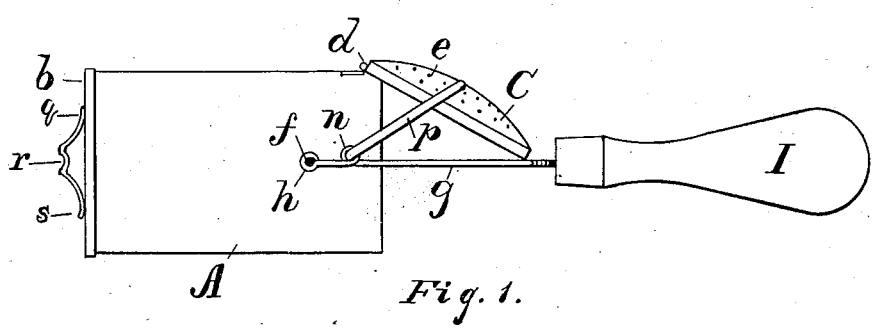
Figure 2:
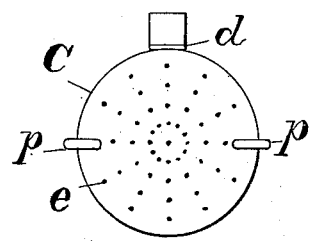
Figure 3:
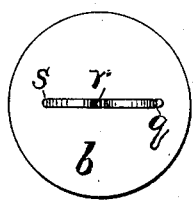
Figures 4, 5:
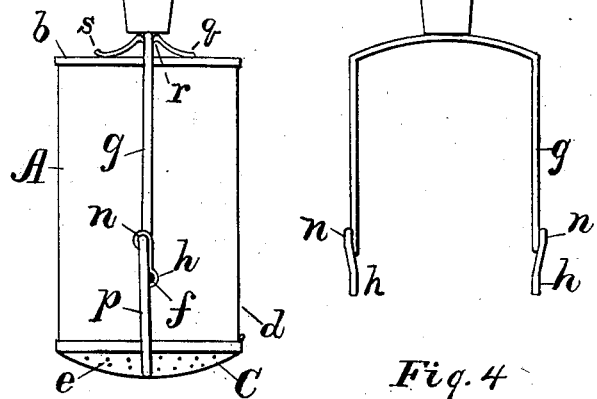

In the drawings hereto annexed, Figure 1 illustrates the device as it is when the water-receptacle is being filled. Fig. 2 is a view of the perforated end or sprinkler separate. Fig. 3 is a view of the opposite end, to which the spring-catch is attached. Fig. 4 is a view of the handle and bail part separate. Fig. 5 is a view of the complete device in position for use as a sprinkler.

The letter A designates the water-vessel, which is a cylinder having one end permanently closed by a head, *b*. The other end is provided with a perforated head, C, which is attached by a hinge, *d*. This head fits sufficiently tight to the end of the cylinder to prevent the water escaping about the joint when the cylinder is turned with the hinged head down, as shown in Fig. 5, the water escaping only through the perforations *e*. Near that end of the cylinder to which the hinged cover is attached, and on each of the diametrically-opposite sides, is a trunnion, *f*. A bail, *g*, has at each of its two extremities an eye, *h*, each of which receives the trunnion on the cylinder. By this connection the cylinder is pivoted and may be reversed or turned upside down within the bail. A suitable handle, I, is attached to the bail. Each of the two sides of the bail is provided near its extremity with a second eye, *n*, and pivoted to the hinged cover on diametrically-opposite sides is one end of a wire or rod, *p*, the other end of which is pivoted or jointed to the eye *n* on the sides of the bail. By this arrangement, when the cylinder is turned within the bail from the position shown in Fig. 5, the effect of the turning is to open the hinged cover, as shown in Fig. 1.

Upon the permanently-closed head *b* of the cylinder a spring-catch is provided, which will engage with the bail and hold the cylinder so that the perforated end will be most remote from the handle, as shown in Fig. 5, and in this position the device is ready for operation. The spring-catch consists of a strip of metal rigidly secured by one end, *q*, to the head of the cylinder. The spring metal strip curves away from the head and forms a notch, *r*, and thence curves again toward the head, terminating in a slightly-curved end, *s*, which rests against the head, but is free or unattached. The general direction of this spring-strip is that of a line at right angles to the diametrical line extending from one trunnion to the other. Thus constructed, the notch *r* of the spring-catch will engage with or release itself from the bail when the cylinder is reversed or its position within the bail is changed.

The operation of the device may be described as follows: To fill the water-vessel from a kettle or bucket, turn the cylinder to the position with respect to the handle shown in Fig. 1, whereby the end with the hinged cover is brought next to the handle, and the cover, by the movement of the vessel, is automatically opened. Then dip or immerse the device in the water. Next hold the vessel stationary, with its open end uppermost, and turn the handle down until the bail engages with the catch. The device is now ready for use, and is employed by swinging the water-vessel by the handle and allowing the water to escape from the perforated head.

Having described my invention, I claim and desire to secure by Letters Patent of the United States—

1. In a sprinkling device, the combination of a water-vessel provided on diametrically-opposite sides with a trunnion, a bail attached to the trunnions, whereby the vessel may be turned upside down within the bail, and a catch by which one end of the water-vessel is held by the bail, as set forth.

2. In a sprinkling device, the combination of a water-vessel having one end permanently closed and the other end provided with a perforated hinged cover, trunnions attached to the vessel on diametrically-opposite sides, a bail attached to the trunnions, and the hinged cover and bail connected on each side by a rod, substantially as set forth.

In testimony whereof I affix my signature in presence of two witnesses.

ELIJAH J. B. WHITAKER.

Witnesses:
 JNO. T. MADDOX,
 CHAS. B. MANN.